Figure 1:
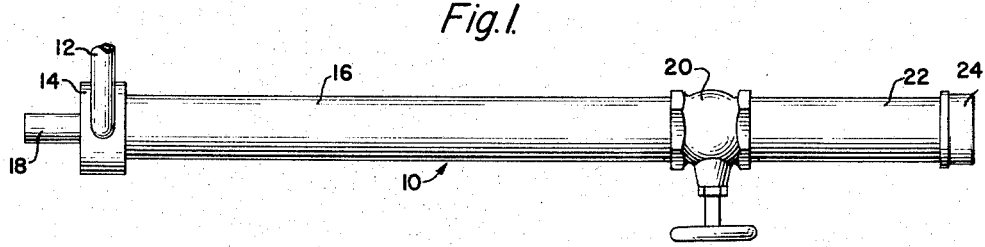

Sept. 22, 1959  F. H. GREEN  2,904,965
VORTEX TUBE WITH FLOW CONTROL MEANS
Filed July 11, 1956

FREDERICK H. GREEN,
INVENTOR.

BY John H.G. Wallace

United States Patent Office 2,904,965
Patented Sept. 22, 1959

2,904,965
VORTEX TUBE WITH FLOW CONTROL MEANS

Frederick H. Green, Palos Verdes Estates, Calif., assignor to The Garrett Corporation, Los Angeles, Calif., a corporation of California Application July 11, 1956, Serial No. 597,251

7 Claims. (Cl. 62—5)

This invention pertains to vortex tube cooling devices and more particularly to an improvement in vortex tubes which increases their efficiency and stabilizes the gas flow in the hot tube of the vortex tube.

A vortex tube is a device which divides a supply of pressurized gas into a stream of hot gas and a stream of cold gas without the benefit of moving parts. A complete description of this type of device may be found in Patent No. 1,952,281, March 27, 1934, entitled "Method and Apparatus for Obtaining From a Fluid Under Pressure Two Currents of Fluids at Different Temperatures" by Georges J. Ranque. Where it is desired to use the device simply as a cooling means, its efficiency can be increased by exhausting all of the gas out the cold gas outlet of the vortex tube. This can be accomplished by closing the end of the hot tube of the vortex tube and cooling the exterior of the hot tube, if desired.

A vortex tube having a large diameter hot tube when compared with the diameter of vortex tubes formerly used is desirable for this type of operation although smaller tubes may be used if properly designed. Of course, the actual diameter of the hot tube is not critical, but when vortex tubes having relatively small diameter hot tubes are used and the hot tubes are closed, the incoming gas may merely short-circuit and pass out the cold outlet without any appreciable cooling effect. In this case, the incoming gas supply does not form a gyratory helical vortex down the hot tube as explained in the Ranque patent When the exterior of the hot tube is cooled, the temperature of the gas flowing from the cold outlet will also be lowered. Thus, the vortex tube with the end of its hot tube closed can be compared with the normal refrigeration cycle where the refrigerant is artificially raised to a temperature above that of the cooling medium and then cooled by the medium. A vortex tube of this design is shown and described in detail in co-pending applications of F. H. Green, Serial No. 171,147, filed June 29, 1950, now Patent No. 2,839,898 and entitled "Multiple Vortex Tube Generator Cooling Unit" and Serial No. 470,726, filed November 23, 1954, now Patent No. 2,790,310 and entitled "Axial Flow Vortex Tube Mechanism," which are incorporated by reference.

While vortex tubes have been operated as described above where substantially all of the incoming supply of compressed gaseous fluid is discharged out the cold outlet of the vortex tube, they sometimes exhibit a very unstable and erratic operation. The exact cause of this unstable operation is not known, but it manifests itself in the following ways: First, the pitch of the noise of the tube will change every few seconds; second, the pressure in the hot tube will change violently and in synchronism with the change in the pitch of the noise; third, the outlet temperature of the air flowing from the cold outlet of the tube will change at the same time that the noise and the pressure in the hot tube changes; last, the proportion of the hot tube which is heated by the vortical flow down the hot tube will change.

All of the above described changes in the operation of a vortex tube indicate that some type of a counter gas flow develops and travels some distance down the hot tube of the vortex tube. When the counter gas flow travels down the hot tube of the vortex tube, it apparently cancels a portion of the gyrating helical gas flow in the hot tube of the vortex tube and thus reduces the effective length of the hot tube. Since a vortex tube is comparable with a normal refrigeration cycle, this means that its efficiency or capacity is reduced. To operate at maximum efficiency, the vortex tube should operate with the helical gas flow traveling as far down the hot tube as possible so that the maximum amount of heat can be dissipated from the exterior thereof.

Accordingly, it is the principal object of this invention to provide a novel means whereby the gas flow in the hot tube of a vortex tube cooling device may be stabilized.

It is another object of this invention to provide a means whereby the gas flow in the hot tube of a vortex tube cooling device may be stabilized when the vortex tube is operated with the end of the hot tube completely closed.

It is another object of this invention to provide a means for stabilizing the flow of gas in the hot tube of a vortex tube utilizing a chamber connected to the end of the hot tube.

Another object of this invention is to provide a means for stabilizing the gas flow in the hot tube of a vortex tube cooling device utilizing a closed chamber which is connected to the end of the hot tube of the vortex tube.

Figure 2:
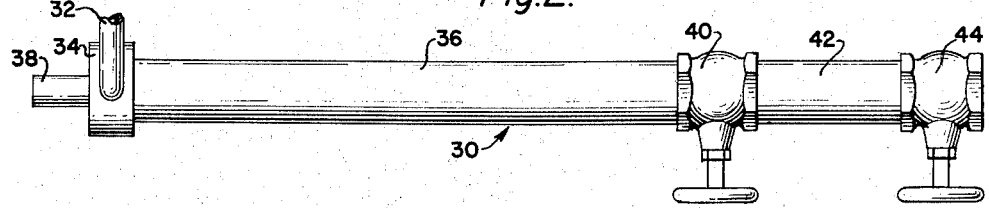
Figure 3:
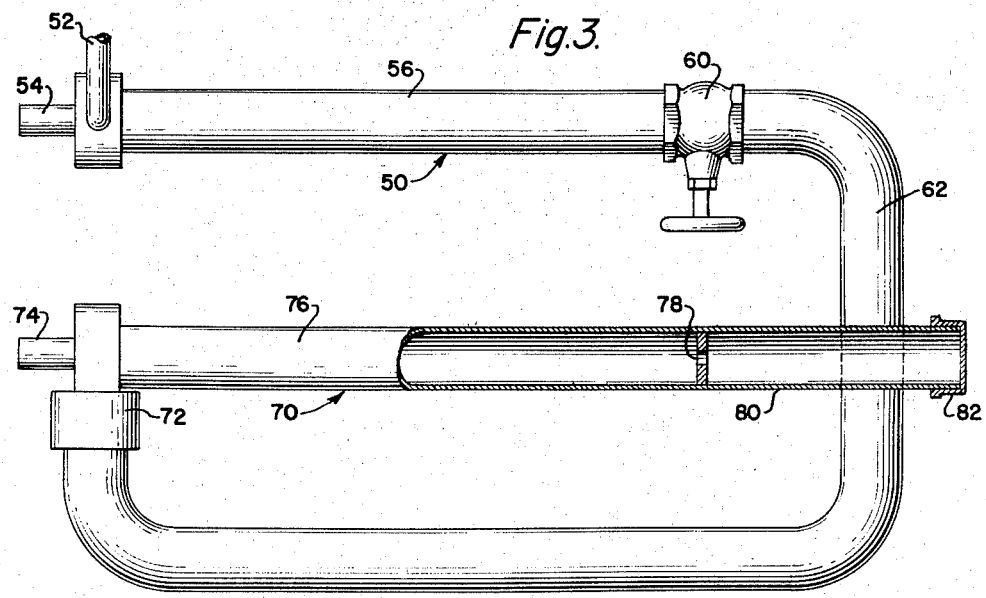

These and other objects of this invention will be more easily understood by those skilled in the art from the following detailed description of preferred embodiments when taken in conjunction with the attached drawings in which Fig. 1 is an elevational view of a vortex tube showing a closed chamber attached to the end of the hot tube;

Fig. 2 is another elevational view of a vortex tube showing a chamber attached to the hot end which may be opened to the surrounding atmosphere if it is so desired; and Fig. 3 is an elevational view of two vortex tubes with the end of the hot tube of one connected to the inlet of the other tube.

It has been discovered that the unstable gas flow in the hot tube of a vortex tube, when the end of the hot tube is completely closed, can be stabilized if the end of the hot tube is connected to a closed chamber and a restricted pass allowed to flow into and out of the closed chamber from the hot tube. This does not reduce the quantity of air flowing from the cold outlet of the vortex tube since the hot tube is, in effect, still completely closed. The exact manner in which this closed chamber, which is attached to the end of the hot tube, stabilizes the gas flow in the hot tube is not understood.

Referring now to Fig. 1, there is shown a vortex tube 10 which has an inlet connection 12 for supplying compressed gas to vortex chamber or nozzle 14. The vortex chamber 14 may be of any desired design, the only requirement being that it causes the incoming gas to flow in a helical path down the hot tube 16. Suitable designs are shown in the co-pending applications referred to above. Connected to the right-hand side of the vortex chamber is a hot discharge pipe or tube 16, and a cold outlet pipe 18 is connected to the left-hand side of the vortex chamber 14. The end of the hot tube 16 is connected to any desired flow restricting means such as the valve 20 shown in Fig. 1. Of course, any other adjustable orifice, fixed orifice, or other type of apertured septum could be used in place of the valve 20 as a flow restricting means. The valve 20, in turn, is connected to a short length of pipe 22 of approximately the same size as the hot tube 16. Finally, the end of the pipe 22 is closed by any desired means such as a pipe cap 24.

When the above described vortex tube was originally operated, it did not have the small length of pipe 22 and cap 24 attached to the right-hand side of valve 22. During the operation of this vortex tube, it was discovered that the flow in the hot tube 16 could be completely shut off by closing the valve 20, and cooled air would still flow from the cold outlet pipe 18. The quantity of air flowing from the cold outlet 18 was equal to the quantity of air supplied to the inlet 12 of the vortex tube. It was also discovered that the temperature of the cooled air flowing from the tube 18 could be further reduced by cooling the exterior of the hot tube 16. While operating a vortex tube in the above manner is very advantageous when it is desired to obtain the greatest quantity of cooled air possible, this type of operation sometimes causes a very unstable gas flow in the hot tube, as explained above.

The normal means for stabilizing the flow of gas in the hot tube of a vortex tube is to bleed a small amount of gas from the end of the hot tube. This small flow of gas assists the flow of the gas down the hot tube in maintaining its gyratory helical form for substantially the complete length thereof. While this type of operation stabilizes the flow in the hot tube of the vortex tube, it means that a quantity of the gas will flow out of the hot end, thus reducing the quantity of cooled air flowing from the cold outlet of the vortex tube.

Even though the exact operation of the device shown in Fig. 1 is not understood, it results in a very efficient cooling device. This device will supply the complete quantity of gas which is supplied to the inlet 12 as cold gas which flows out the cold outlet 18. The helical flow of gas down the hot tube 16 will not fluctuate or move back and forth along the length of the hot tube even though the extreme end of the hot tube is completely closed.

Shown in Fig. 2 is another embodiment of this invention in which the hot tube 36 of a vortex tube 30 is equipped with a suitable flow restricting means, such as a valve 40, at its extreme right-hand end. Attached to the valve 40 is a short length of pipe 42 and a second flow restricting means such as a valve 44. This embodiment was built so that the first valve 40 could be completely opened and the flow in the hot tube 36 shut off by means of the valve 44 so that it could be determined accurately whether the added length of the hot tube of the vortex tube accomplished the stabilizing or whether it was the use of a closed chamber connected to the end of the hot tube which stabilized the operation of the vortex tube. This embodiment also allowed the valve 40 to be used as the flow restricting means in the hot tube 36 and the short length of pipe 42 and valve 44 to be used as a closed chamber which is connected to the end of hot tube 36. From the operation of this embodiment it was determined that the use of the closed chamber was the means which stabilized the flow of the gas in the hot tube 36, and not the slightly added length to the end of the hot tube.

Shown in Fig. 3 is a third embodiment of this invention in which the outlet 60 from the hot tube of a vortex tube 50 is connected to the inlet 72 of another vortex tube 70. The vortex tube 50 has a suitable inlet 52, cold outlet 54, and a hot tube 56 which, in turn, is equipped with a valve 60 at its extreme right-hand end so that the flow therefrom can be restricted. The hot tube of vortex tube 50 is connected to the inlet 72 of vortex tube 70 by means of the conduit 62. The vortex tube 70 has a cold outlet 74 and a hot tube 76 which has a fixed orifice 78 for restricting the flow of hot gas in place of the valves shown in Figs. 1 and 2. The right-hand side of the orifice 78 is connected to a small section of pipe 80 which is closed at its other end by any desired means such as a cap 82.

The embodiment shown in Fig. 3 will operate in substantially the same manner as those shown in Figs. 1 and 2 with the tube 70 acting as the stabilizing chamber for the tube 50. The hot tube of the first vortex tube 50 is connected to the inlet of the second vortex tube 70, thus the gas flow in the second tube 70 effectively maintains a back pressure on the end of the hot tube 50 of the first vortex tube which has the same effect as the closed chamber of Fig. 1. The closed end pipe 80, which is attached to the end of the hot tube 76 of the vortex tube 70, operates in the same manner as those shown in Figs. 1 and 2. Thus, the embodiment shown in Fig. 3 will supply substantially all of the gas admitted to the vortex tube 50 as cooled gas at the cold outlets 54 and 74 of the vortex tubes 50 and 70.

From the above described embodiments, it can be seen that a unique design vortex tube cooling device has been developed which greatly improves its efficiency. The vortex tube cooling devices disclosed in this specification are unique in that they supply substantially all of the gas admitted to the vortex tube as cooled gas at the cold outlet of the vortex tube while maintaining a stabilized flow of gas in the hot tube of the vortex tube. The flow of gas in the hot tube of the vortex tube of this invention is stabilized by connecting a closed chamber to the end of the hot tube. While the exact operation of this closed chamber in cooperation with the hot tube of the vortex tube is not understood, it has proven to be very successful in stabilizing the helical flow of the gas in the hot tube. This closed chamber was successful in eliminating the erratic flow in the hot tube which, in turn, stabilized the operation of the vortex tube and increased its efficiency by utilizing the complete length of the hot tube.

Accordingly, while three specific embodiments of this invention have been shown and described in detail, it is to be understood that it is not so limited as many modifications will occur to those skilled in the art.

I claim:

1. A vortex tube comprising: tubular means forming the hot and cold tubes of said vortex tube; inlet means for admitting a pressurized fluid to the interior of said tubular means; means forming a closed chamber of predetermined volume, the end of the hot tube of said vortex tube being connected to said closed chamber; and flow restricting means disposed between said hot tube and said closed chamber.

2. A vortex tube comprising: tubular means for forming the hot and cold tubes of said vortex tube; inlet means for admitting a pressurized fluid to the interior of said tubular means; means connected to the end of said hot tube and forming a closed chamber of predetermined volume; and means permitting a restricted flow of fluid between said hot tube and said closed chamber.

3. A vortex tube wherein all of the fluid supplied to the tube is discharged as cooled fluid from the cold outlet of the tube comprising: means forming a hot tube; flow restricting means mounted in one end of said hot tube; the said one end of said hot tube being connected to tubular means forming a closed chamber of fixed capacity.

4. A vortex tube wherein all of the fluid supplied to the tube is discharged as cooled fluid from the cold outlet of the tube comprising: means forming a hot tube, flow restricting means mounted in one end of said hot tube; the said one end of said hot tube being connected to one end of a tubular member, the opposite end of said tubular member being closed and the axis of said tubular member and said hot tube being substantially aligned.

5. A cooling system comprising: a first vortex tube having means forming hot and cold fluid outlets, a first flow restricting means mounted in said hot fluid outlet; conduit means connecting said hot fluid outlet to the inlet of a second vortex tube; said second vortex tube having means forming a hot tube and a cold fluid outlet; a second flow restricting means mounted in one end of the hot tube of said second vortex tube; the hot tube of said second vortex tube being connected at said one end to a tubular member, the other end of said tubular member being closed and the axis of said tubular member being substantially aligned with the axis of the hot tube of said second vortex tube.

6. A vortex tube having an inlet for a gaseous fluid and an outlet for cooled fluid, comprising: means forming a hot tube; flow restricting means mounted at one end of said hot tube; the said one end of said hot tube being connected to a tubular member forming a closed chamber, said hot tube and said tubular member having generally the same cross sectional size and being substantially aligned.

7. In a vortex tube having an inlet for a gaseous fluid and an outlet for cooled fluid: means forming a hot tube; a closed chamber connected to said hot tube; and means providing a restricted passage between said hot tube and said closed chamber.

References Cited in the file of this patent

UNITED STATES PATENTS

| | | |
|---|---|---|
| 2,683,972 | Atkinson | July 20, 1954 |
| 2,737,028 | Machlanski | Mar. 6, 1956 |
| 2,786,341 | Green | Mar. 26, 1957 |

FOREIGN PATENTS

| | | |
|---|---|---|
| 276,405 | Switzerland | Oct. 1, 1951 |

UNITED STATES PATENT OFFICE

CERTIFICATE OF CORRECTION

Patent No. 2,904,965                          September 22, 1959

Frederick H. Green

It is hereby certified that error appears in the printed specification of the above numbered patent requiring correction and that the said Letters Patent should read as corrected below.

Column 2, line 48, for "pass allowed to flow" read -- flow allowed to pass --.

Signed and sealed this 9th day of August 1960.

(SEAL)
Attest:

KARL H. AXLINE
Attesting Officer

ROBERT C. WATSON
Commissioner of Patents